United States Patent [19]

Yoshinaka et al.

[11] Patent Number: 4,714,954

[45] Date of Patent: Dec. 22, 1987

[54] READ START PULSE GENERATOR FOR TIME BASE CORRECTOR

[75] Inventors: Tadaaki Yoshinaka; Takao Inoue, both of Kanagawa, Japan

[73] Assignee: Sony Corporation, Tokyo, Japan

[21] Appl. No.: 826,223

[22] Filed: Feb. 5, 1986

[30] Foreign Application Priority Data

Feb. 16, 1985 [JP] Japan ................................ 60-28913

[51] Int. Cl.[4] ............................................. H04N 9/475
[52] U.S. Cl. ........................................ 358/19; 358/326
[58] Field of Search .................. 358/19, 17, 320, 324, 358/326, 337

[56] References Cited

U.S. PATENT DOCUMENTS

| 4,389,663 | 6/1983 | Tatami | 358/19 |
| 4,422,103 | 12/1983 | Kanamaru | 358/326 X |
| 4,562,457 | 12/1985 | Salvia | 358/19 |

FOREIGN PATENT DOCUMENTS

| 0138333 | 10/1979 | Japan | 358/19 |
| 2160054 | 12/1985 | United Kingdom | 358/19 |

Primary Examiner—James J. Groody
Assistant Examiner—Victor R. Kustak
Attorney, Agent, or Firm—Lewis H. Eslinger; Alvin Sinderbrand

[57] ABSTRACT

A read start pulse generator comprises circuit elements for automatically adjusting the phase of a read start pulse signal by cancelling phase offset caused when phase adjustments are made to a synchronizing signal, burst signal, and hue signal.

8 Claims, 12 Drawing Figures

READ CLOCK GENERATOR

SIG. WAVEFORMS OF EACH SECTION IN FIG. 2

READ START PULSE GENERATOR FOR TIME BASE CORRECTOR

BACKGROUND OF THE INVENTION

1. Field of the Invention

The present invention relates generally to a read start pulse generator for an image signal processing system, and more specifically to a read start pulse generator incorporated in a time base corrector at a video tape recorder.

2. Description of the Prior Art

In an image signal processing system such as video tape recorder, a time base corrector is usually incorporated, by which a reproduced video signal is once written in a memory after A-D conversion and then read from the memory in synchronization with a stable reference pulse signal before D-A conversion.

The video signal the time base of which is thus corrected is outputted together with a synchronizing signal, a burst signal and a blank pulse signal all included in the reference pulse signal. In order to write or read the reproduced video signal in or from the memory, a write clock generator and a read clock generator are included in the time base corrector. The write clock generator generates a write start pulse signal to designate each head address of each scanning line in the memory and a write clock signal to sequentially increment the address in writing the video signal; the read clock generator generates a read start pulse signal to designate each head address of each scanning line in the memory and a read clock signal to sequentially increment the address in reading the video signal.

In the time base corrector shown in FIG. 1, it is necessary to allow the memory controller 5 to be able to automatically adjust the timing (i.e. the phase) of generating the write start pulse or the read start pulse in order to repeatedly write or read the image signal data for each scaning line in or from the memory under good reproducibility. Further, in writing or reading the video signal data in or from the memory, it is necessary to write or read the data corresponding to one cycle of color subcarrier signal as a unit in order to maintain the continuity of color subcarrier phase in the memory. That is, it is necessary to synchronize the timing of generating the write or read start pulse signal with that of the color subcarrier signal. In the case of NTSC (national television system comittee) type, since the frequency of the subcarrier is set to 455/2 times the line frequency, it is necessary to shift the phase of the write or read start pulse by a ½ period (about 140 ns) of the color subcarrier for each scanning line. In practice, in order to generate the write and read start pulses, an automatic phase controller (APC) is usually incorporated in the read clock generator and the write clock generator, respectively.

By the way, in a video tape recorder for broadcasting stations, there exists a need of a read clock generator by which the phase of the synchronizing signal or the burst signal can be adjusted by any given phase shift relative to the station's reference signal, where necessary, in order to take matching with other system connected to the time base corrector.

In the prior-art read clock generator of the time base corrector, therefore, since there are provided various adjusting devices such as horizontal synchronization phase adjusting device, a color subcarrier phase adjusting device, and a hue adjusting device, in addition to the horizontal synchronization color subcarrier phase adjusting device, if the above adjusting devices are operated after the horizontal synchronization color subcarrier phase adjusting device has been operated, there exists a problem in that the horizontal synchronization color subcarrier phase adjusting device should be adjusted again; that is, it is impossible to operate other adjusting devices, independently, thus causing a complicated time base corrector adjusting operation.

The arrangement and the operation of the prior-art read clock generator will be described sufficiently in detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a read start pulse generator incorporated with a read clock generator of a time base corrector for a video tape recorder, for instance, by which it is unnecessary to readjust the automatic phase controller for color subcarrier synchronization even after the horizontal synchronization phase, subcarrier phase, and/or hue have been adjusted.

To achieve the above-mentioned object, in a read start pulse generator of an automatic color subcarrier synchronizing phase controller type for receiving a read horizontal synchronizing signal HSYNC and a read subcarrier signal RSC both adjustably phase-shifted by predetermined values from a reference horizontal synchronizing signal HSYNCR and a reference burst signal BURSTR both separated from a reference pulse signal VDREF, comparing in phase between a timer output MODH and the read subcarrier signal RSC after a predetermined timer time has elapsed from the read horizontal synchronizing signal HSYNC, and latching the timer time by the read subcarrier signal RSC while controlling the timer time so that a phase error signal PEK between the two signals MODH and RSC becomes zero in order to generate a read start pulse RZERO in synchronization with the read subcarrier signal RSC, said read start pulse generator according to the present invention comprises means for adjusting the phase of the timer output DODH by cancelling phase offsets caused by the phase-adjusted read horizontal synchronizing signal HSYNC, and the phase-adjusted read subcarrier signal RSC.

Or else, to achieve the above-mentioned object, in a read start pulse generator of an automatic color subcarrier synchronizing phase controller type for receiving a reference horizontal synchronizing signal HSYNCR and a reference burst signal BURSTR, S21 both separated from a reference pulse signal VDREF, comparing in phase between a timer output MODH and the reference burst signal S21 after a predetermined timer time has elapsed from the reference horizontal synchronizing signal HSYNCR, and latching the timer time in response to the burst signal S21 while controlling the timer time so that a phase error signal PER between the two signals MODH and S21 becomes zero in order to generate a latch output 27Q, the read start pulse generator according to the present invention comprises means for adjusting the phase of the latch output 27Q by cancelling phase offsets caused by the phase-adjusted burst signal CON2 and the hue adjust signal CON3 before generating a read start pulse signal RZERO by latching the latch output 27Q in response to a phase-adjusted read subcarrier signal RSC.

BRIEF DESCRIPTION OF THE DRAWINGS

The features and advantages of the read start pulse generator according to the present invention over the prior art generator will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present inveniton, a fairly detailed reference will be made to a prior-art read start pulse generator with respect to its application to a time base corrector (TBC) incorporated within an image signal processor such as a video tape recorder, for instance, with reference to the attached drawings.

In some image signal processors such as a video tape recorder, a time base corrector is usually used in which a reproduced video input signal VDIN is first converted into a corresponding digital signal by an A-D converter 4, stored in a memory unit 6, read from the memory unit 6 in synchronization with a stable reference signal VDREF, and converted again into a corresponding analog signal by an D-A converter 8 as video data.

Figure 1:
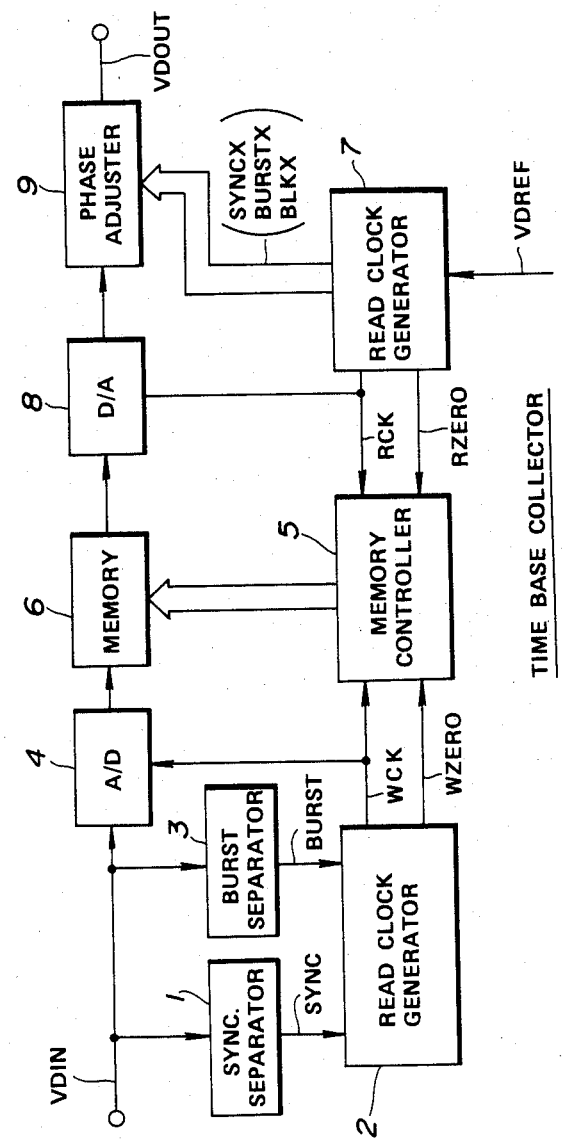
FIG. 1 is a schematic block diagram showing an exemplary general system configuration of a prior-art time base corrector to which a read clock generator including the read start pulse generator according to the present invention is applied.

In more detail, with reference to FIG. 1, a reproduced synchronizing signal SYNC is separated from the reproduced input signal VDIN reproduced from a tape by a synchronization separator 1 and is applied to a write clock generator 2. Further, a reproduced burst signal BURST is separated from the reproduced input signal VDIN by a burst separator 3 and is also applied to the write clock generator 2.

The write clock generator 2 generates a write clock signal WCK and a write start pulse signal WZERO in synchronization with the reproduced synchronization signal SYNC and the reproduced burst signal BURST both having fluctuations on time base. The write clock signal WCK is given to an analog-digital converter 4 as a sampling pulse signal and also to a memory controller 5 together with the write start pulse signal WZERO.

In response to the write start pulse signal WZERO, the memory controller 5 designates each head address of each scanning line in the memory 6 and thereafter writes image signal data for each scanning line (i.e. for each 1H) in the memory 6 in sequence by sequentially incrementing the address in response to the write clock signal WCK.

The data written in the memory 6 are read in response to a read clock signal RCK and a read start pulse signal RZERO generated from a read clock generator 7 in response to a reference pulse signal VDREF having a stable period. That is to say, the memory controller 5 designates each head address of the memory area at which data for each scanning line are stored in response to the read start pulse signal RZERO, and thereafter reads image signal data for each 1H in sequence from the memory 6 by incrementing the address in response to the read clock signal RCK.

The image signal data are converted into analog signals by a digital-analog converter 8 driven in response to the read clock signal RCK and then outputted to a phase adjuster 9. The phase adjuster 9 sends out a reproduced output signal VDOUT by adding a synchronizing signal SYNCX, a burst signal BURSTX, and a blank pulse BLKX all included in the reference pulse signal VDREF within the read clock generator 7.

In the time base corrector as shown in FIG. 1, it is necessary for the memory controller 5 to automatically adjust the timing (i.e. phase) at which the head addresses are designated so that the head data of the image signal can repeatedly and reliably be written in or read from the memory area having predetermined head addresses whenever image signal data for each scanning line are written in or read from the memory 6.

In this case, an important point is that it is necessary to write or read data corresponding to one cycle of the color subcarrier as one unit when writing or reading image signal data in or from the memory 6, in order to maintain the continuity of the phase of the color subcarrier in the memory 6 and addtionally to provide an easy matching with the processing in the read-side circuit.

Therefore, in the memory controller 5, it is necessary to synchronize the timing, at which the write start pulse signal WZERO or the read start pulse signal RZERO is generated, with the color subcarrier. However, in a color television of NTSC (National Television System Committee) type, since the frequency of the color subcarrier is 455/2 times of the line frequency and therefore the phase of the subcarrier between two sequentially adjacent scanning lines is shifted $\frac{1}{2}$ cycle, it is necessary to shift the phases of the write start pulse signal WZERO sent from the write clock generator 2 and the read start pulse signal RZERO sent from the read clock generator 7 by $\frac{1}{2}$ period (about 140 ns) of the color subcarrier for each scanning line.

In this case, since the phase of the write start pulse signal WRERO and the phase of the read start pulse signal RZERO are both shifted by $\frac{1}{2}$ period for each scanning line, the image signal data read from the memory 6 can perfectly be restored in phase relation between writing and reading.

In practice, in order to generate the write start pulse signal WZERO and the read start pulse signal RZERO both having the phase difference as described above, an automatic phase controller (APC circuit) is provided in the write clock generator 2 and the read clock generator 7, respectively.

Figure 2A:
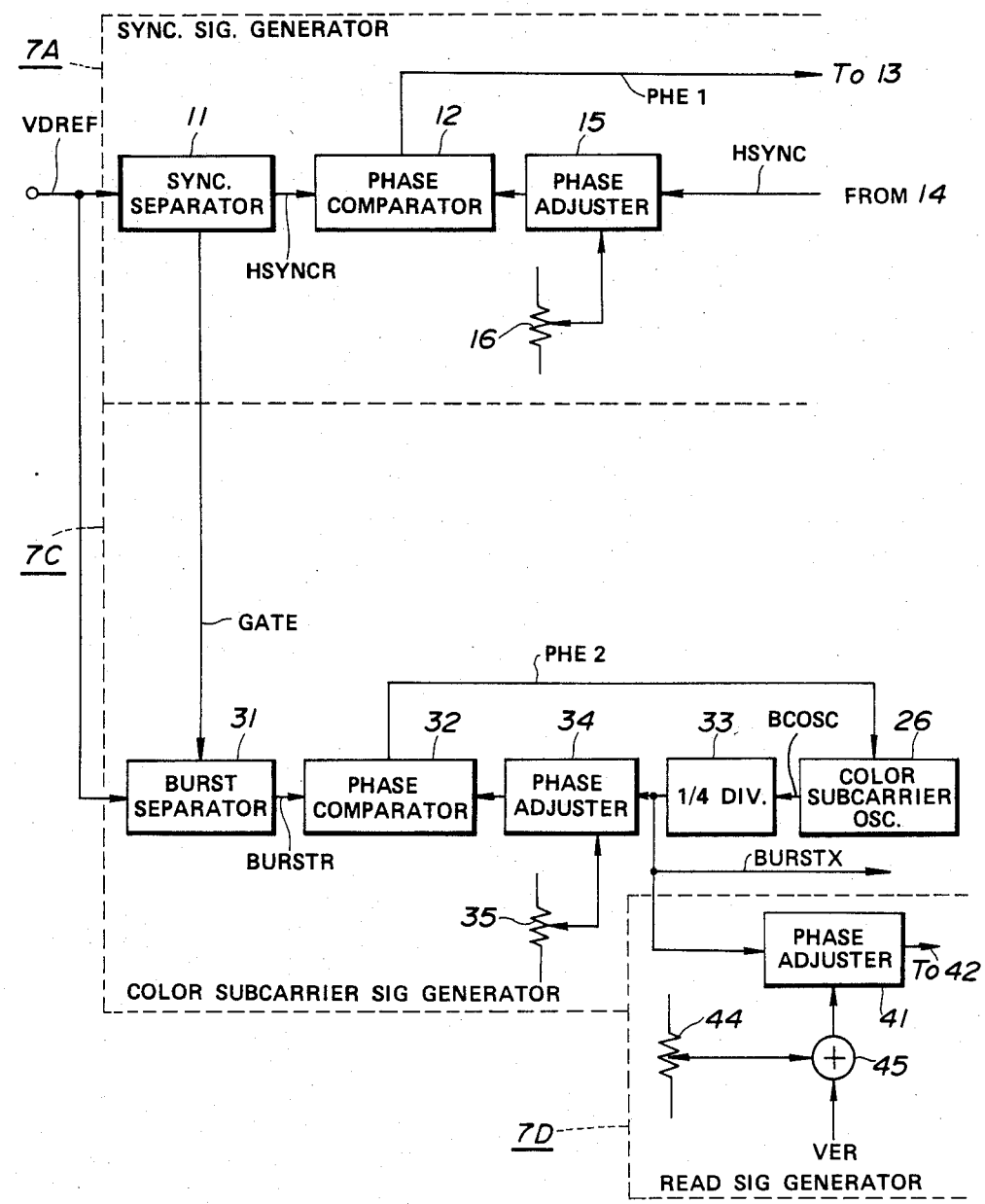
FIGS. 2A-2B is a schematic block diagram of an example of a read clock generator including a prior-art read start pulse generator.
Figure 2B:
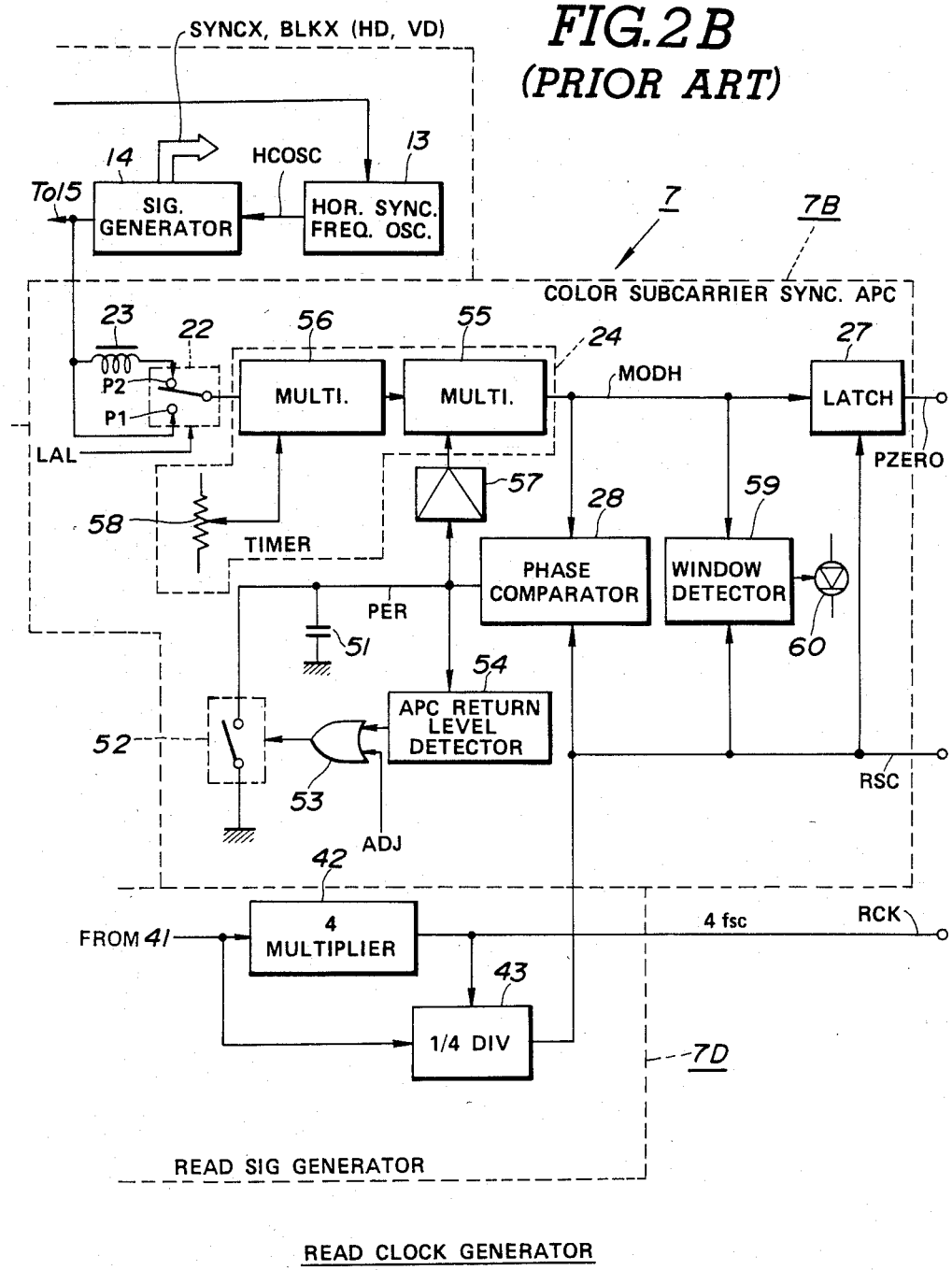

By the way, in VTRs for broadcasting stations, there is used a read clock generator 7 as shown in FIG. 2, in which in order to take matching with a device provided at the succeeding stage, the phases of the horizontal synchronizing signal and the burst signal can be adjusted by any given phase difference value from the reference pulse signal VDREF (i.e. a reference signal of the station) where necessary. The read clock generator 7 of this type will be described hereinbelow with reference to FIGS. 2 and 3. A horizontal snchronizing signal HSYNCR included in a reference pulse signal VDREF is separated from a synchronization separator 11 and then supplied to a phase comparator 12. On the other hand, from a horizontal synchronization frequency oscillator 13 of a voltage control type oscillator (VCO), an oscillation output HCOSC having a frequency $nf_H$ n times higher than the horizontal synchronization frequency $f_H$ is supplied to a signal generator 14. In response to the oscillation output HCOSC, a horizontal synchronization signal HSYNC is generated and supplied to a phase comparator 12 after the phase has been adjusted through a phase adjuster 15 made up of a phase shifter.

The phase comparator 12 feeds back a phase error voltage PHE1 between the horizontal synchronization signal HSYNC supplied from the phase adjuster 15 and the reference horizontal synchronization signal HSYNCR to the horizontal synchronization frequency oscillator 13 in order to control the oscillation frequency of the oscillator 13 so that the phase error voltage PHE1 becomes zero. Therefore, the horizontal synchronization signal HSYNC obtained by the signal generator 14 has a phase shift corresponidng to a phase difference produced by the phase adjuster 15 relative to the phase of the reference horizontal synchronizing signal HSYNCR.

The phase adjuster 15 includes a horizontal synchronization phase adjusting device 16. The phase-shift value of the adjusting device 16 can be adjusted freely when the operator operates this adjusting device 16 where necessary. As described above, it is possible to freely determine the phase difference between the horizontal synchronization signal HSYNC and the reference horizontal synchronization signal HSYNCR.

Further, in the case of the prior-art example, the signal generator 14 outputs a synchronization signal SYNCX and a blank signal BLKX (made up of a horizontal synchronizing signal HD and a vertical synchronizing signal VD) synchronized with the horizontal synchronization signal HSYNC.

The horizontal snchronizing signal HSYNC is supplied to an automatic phase controller (APC) 7B for color subcarrier synchronization. The APC 7B receives the horizontal synchronizing signal HSYNC directly at one switch input terminal $P_1$ of a switch circuit 22 and the other switch input terminal $P_2$ of the same switch circuit 22 after being delayed by ½ period (i.e. 140 ns) through a delay circuit 23. The switch circuit 22 operates to switch the switch input terminals $P_1$ and $P_2$ for each 1H section in response to a sequential line switching signal LAL the logical level of which is inverted for each 1H period on the basis of the reproduced horizontal synchronizing signal HSYNC. The horizontal synchronizing signal HSYNC is delayed by ½ period of the color subcarrier for each 1H section through the delay circuit 23 and then inputted as a trigger signal to a timer circuit 24 made up of two mono-multivibrators.

Figure 3:
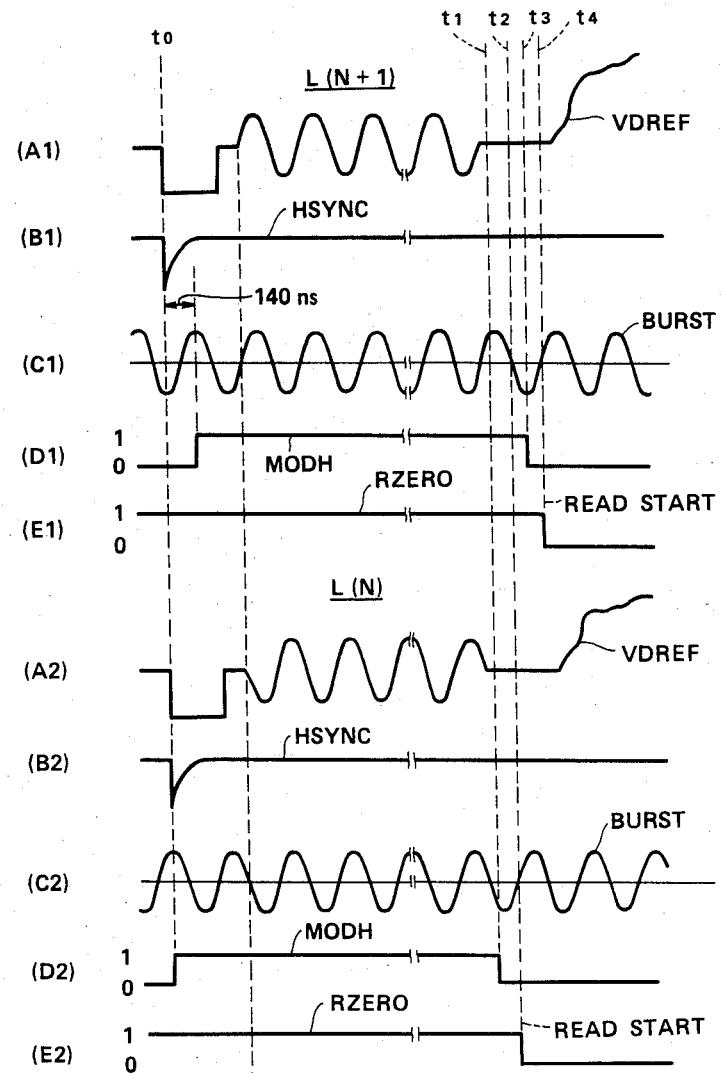
FIG. 3 is a timing chart showing various waveforms at each section of the prior-art read clock generator shown in FIG. 2, for assistance in explaining the timing of various signals.

The timer circuit 24 generates a timer output MODH indicative of time points near time points at which the read start pulse signal RZERO should be generated on the basis of the timing of the horizontal synchronizing signal HSYNC. As shown in FIGS. 3 ($A_2$) to ($E_2$) in which the n-th scanning line LN is explained, the horizontal synchronizing signal HSYNC (FIG. 3 ($B_2$)) is received at time point $t_0$ through the switch input terminal $P_1$ of the switch circuit 22 to generate a timer output MODH which rises logically to "1" as shown in FIG. 3 ($D_2$). Thereafter, the timer circuit 24 operates in such a way that the timer output MODH falls logically to "0" at the time point $t_1$ just prior to the time point $t_2$ at which the read start pulse signal RZERO should be generated (FIG. 3 ($E_2$)).

This timer output MODH is supplied to a latch circuit 27. This latch circuit 27 operates in response to a read subcarrier signal RSC obtained by a read signal generator 7D on the basis of an oscillator output BCOSC of a color subcarrier frequency oscillator 26 in a color subcarrier signal generator 7C. By this, at the timing corresponding to the time point $t_2$ (FIG. 3) at which the burst signal BURST (FIG. 3 ($C_2$)) generated on the basis of the oscillation output BCOSC goes across the zero point from the negative side to the positive side, the logical level of the timer output MODH is latched by the latch circuit 27. Therefore, the read start pulse signal RZERO obtained at the output terminal of the latch circuit 27 falls logically from "1" to "0" at the time point $t_2$ because the timer output MODH falls logically to "0" at the time point $t_1$ immediately before the time point $t_2$, so that the reading of data from the memory 6 begins in response to this trailing edge.

On the other hand, with respect to the (N+1)th scanning ling L (N+1), the timer 24 receives the horizontal synchronization signal HSYNC as a trigger signal through the delay circuit 23 and further the switch input terminal $P_2$ of the switch circuit 22. Therefore, as shown in FIG. 3 ($D_1$), the timer circuit 24 generates a timer output MODH which rises at a time point delayed by a delay time (140 ns) of the delay circuit 23 from the time point $t_o$. Thereafter, the timer output MODH falls logically to "0" at the time point $t_3$ immediately before the time point $t_4$ at which the read start pulse signal RZERO should be generated.

In this case, the phase of the burst signal BURST is delayed ½ period of the color burst signal (which corresponds to the delay time of the delay circuit 23) as compared with the case shown in FIG. 3 ($C_2$). Therefore, the timing at which the timer output MODH of the timer circuit 24 falls occurs immediately before the read start pulse signal RZERO in both cases of the (N)th and (N+1)th scanning lines.

This timer output MODH is compared with the read subcarrier signal RSC by a phase comparator 28. The read subcarrier signal RSC is formed by the read signal generator 7D on the basis of the burst signal BURST formed by the color subcarrier signal generator 7C. In the color subcarrier signal generator 7C, a burst separator 31 separates the burst signal included in the reference pulse signal VDREF in response to a gate signal GATE supplied from the synchronization separator 11, the obtained burst signal BURSTR being given to a phase comparator 32.

On the other hand, in the color subcarrier frequency oscillator 26 of a voltage controlled type oscillator (VCO) including a quartz oscillator, an oscillation output BCOSC having a frequency $4f_{sc}$ four times higher than the color subcarrier frequency $f_{sc}$ is outputted, being divided through a ¼ divider 33, and supplied to the phase comparator 32 as the burst signal BURSTX through a phase adjuster 34. Then, a phase error voltage PHE2 obtained by the phase comparator 32 is fed back to the color subcarrier frequency oscillator 26 to output an oscillation output BCOSC for allowing the phase error voltage PHE2 to become zero.

The phase adjuster 34 is made up of phase shifters and includes a subcarrier phase adjusting device 35. When the operator adjusts this adjusting device 35, the phase difference between the burst signal BURSTX and the separate burst signal BURSTR can be adjusted freely on the basis of a phase difference value in the phase adjuster 34.

The burst signal BURSTX is given to a phase adjuster 41 made up of phase shifters and included in the read signal generator 7D in order to shift the phase thereof, and then the frequency thereof is multiplied by four through the 4/1 multiplier 42. Therefore, the read clock signal RCK having a frequency $4f_{sc}$ four times higher than the color subcarrier frequency is outputted from the output terminal of the 4/1 multiplier 42.

This read clock signal RCK is given to a ¼ divider 43, so that the read subcarrier signal RSC having a frequency $f_{sc}$ of the color subcarrier can be obtained from the output terminal of the divider 43. Here, an output of the phase adjuster 41 is given to the ¼ divider 43 as a reset signal to synchronize the divider operation with the burst signal the phase of which is adjusted by the phase adjuster 41, so that the phase of the read subcarrier signal RSC is synchronized with the output of the phase adjuster 41.

To this phase adjuster 41, an addition output of an adjustment output applied from a hue adjusting device 44 as a phase adjusting signal and a velocity error signal VER is given through an adder 45. Therefore, the phase differences between the read clock signal RCK and the burst signal BURSTX and between the read subcarrier signal RSC and the burst signal BURSTX can be adjusted on the basis of the adjustment output of the phase adjusting device 44 and the velocity error signal VER.

As described above, a phase comparator 28 of the APC 7B for color subcarrier synchronization compares in phase the trailing edges of the timer output MODH (FIG. 3 ($D_2$) and ($D_1$)) with the zero-cross points of the burst signal BURST (FIG. 3 ($C_2$) and ($C_1$)), generates a phase error output PER indicative of the phase difference between the two, and gives this output to the timer circuit 24 as a timer time control signal. At this moment, the timer circuit 24 operates in such a state where the phase error output PER indicates a small advance phase difference previously determined relative to the zero-cross points of the burst signal BURST.

The timer output MODH thus phase-controlled is given as an input data to a latch circuit 27 which latch-operates at the zero-cross points of the burst signal BURST, and outputs a read start pulse signal RZERO falling logically to "0" at the time points at which the burst signal BURST goes across the zero points. Therefore, the read start pulse signal RZERO can be generated securely being synchronized with the zero-cross points of the burst signal BURST, because the timer output MODH is allowed to fall logically to "0" immediately before the time point (i.e. $t_2$ and $t_4$) at which video signal data should be started to read from the memory 6.

By the way, since the zero-cross points of the burst signal BURST are generated for each period, where the phase difference between the timer output MODH and the read subcarrier signal RSC is too great, there exists a problem such that the trailing edges of the read start pulse signal RZERO are stabilized at zero-cross points other than the points immediately before the image signal data.

To solve the above-mentioned problem, the conventional color subcarrier synchronizing APC 7B shown in FIG. 2 is provided with a capacitor 51 and a switch circuit 52 at the output terminal of the phase compartor 28 in order to hold the phase error output PER and to supply a predetermined voltage level (e.g. ground voltage) through this switch circuit 52. This switch circuit 52 is on-off controlled by a detection output of an APC return level detector 54 through an OR gate 53. When the signal level of the phase error output PER is beyond the pull-in enable range, the capacitor 51 is grounded via the switch circuit 52 in order to return the phase error output PER to the ground potential.

In this connection, since in the phase pull-in loop by the output of the phase comparator 28, the stable points are switched for each scanning line by the switch circuit 22, there exists a problem in that it is impossible to always pull-in the timer output MODH at the phase immediately before the time point $t_2$ or $t_4$ shown in FIG. 3. Further, there exists a problem in that it is impossible to pull-in the timer output MODH in the case where the horizontal synchronizing signal HSYNC is not continuous due to dropouts or phase jump. As described above, when the phase error output PER of the phase comparator 28 changes to values at which pull-in operation is impossible, the APC operation is returned to the normal operating state by locking the phase error output PER forcibly to zero (volts) by the APC return level detector 54 and the switching circuit 52. By this, when the horizontal synchronizing signal HSYNC is returned to the normal state, since the timer output MODH of the timer circuit 24 is returned to the nearest stable point (zero-cross points of the burst signal), it is possible to securely reproduce the phase of the read start pulse signal RZERO.

In the above manner, however, in the case where the timer output MODH falls at time points corresponding to the midpoints in phase between two stable points existing for each period of the burst signal BURST, two stable points occur. In practice, in manufacturing the timer circuit 24, there inevitably exists dispersion in the timer time, thus there existing a problem in that an improper timer circuit is used. In this case, the read start pulse signal RZERO cannot be generated with a single phase, thus causing an unsufficient result in the case where the phase of video signal must be reproduced strictly such as when the reproduced video signal is edited.

To overcome the above-mentioned problem, in the case of the prior-art read clock generator shown in FIG. 2, the timer circuit 24 is composed of a first mono-multivibrator 55 having a sufficiently long timer time and a second mono-multivibrator 56 having a sufficiently short timer time, for instance, as short as about one period of the burst signal, and the phase error output PER of the phase comparator 28 is given to the first mono-multivibrator 55 through the buffer 57 as a timer time control signal. Further, a horizontal synchronizing color subcarrier phase adjusting device 58 is provided for the second mono-multivibrator 56, so that the time point of the trailing edge of the timer output MODH can finely be adjusted by this adjusting device 58.

In this case, the switching circuit 52 is adapted to be turned on by an adjustment mode signal ADJ via an OR gate 53.

Further, the timer output MODH and the burst signal BURST are given to a window detector 59 to light up a display element 60 when the phase difference lies within a predetermined window range. The window detector 59 detects that the phase of the timer output MODH is in close proximity to the stable points (i.e. any one of zero-cross points) of the burst signal BURST.

When the color subcarrier synchronizing APC 7B is configured as described above, it is possible to adjust the phase of the trailing edge of the timer output MODH to near the stable point by the phase comparator 28 and the APC return level detector 54 before the APC operation. That is, a timer time control signal of ground potential level is given to the first mono-multivibrator 55 of the timer circuit 24 by applying an adjust mode signal ADJ to the switch circuit 52 through an OR gate 53 to turn on the switch circuit 52 and thus discharging the capacitor 51 for holding the phase error output of the phase comparator 28 to the ground potential via the switch circuit 52. At this moment, the multivibrator 55 is controlled so as to have a timer time of the lock-in operation.

In this state, the timer time of the second mono-multivibrator 56 is adjusted by operating the phase synchronizing color subcarrier phase adjusting device 58 to light up the display element 60. As a result, once the display element 60 goes on, it is possible to adjust the phase of the trailing edge of the timer output MODH generated during this adjustment to near a stable point at which the phase should be locked of a plurality of stable points of the burst signal BURST.

Once the state where this display element 60 is lighted up is obtained, the adjust mode signal ADS is switched to the normal operation state which is indicated by logic "0" to switch the switch circuit 52, thus the mode being switched to the APC operation based on the phase comparator 28 and the APC return-level detector 54. At this moment, since the timer output MODH has been adjusted to near a stable point of the burst signal BURST, it is possible to readily pull-in the timer output MODH to the stable point.

However, the prior-art read clock generator shown in FIG. 2 involves the following problems. In the color subcarrier synchronizing APC 7B shown in FIG. 2, after the timer circuit 24 has been adjusted by adjusting the horizontal synchronizing color subcarrier phase adjusting device 58, whenever the horizontal synchronizing phase adjusting device 16 of the synchronizing signal forming circuit 7A is adjusted, or the subcarrier phase adjusting device 35 of the color subcarrier signal forming circuit 7C is adjusted, or the hue adjusting device 44 of the read signal forming circuit 7D is adjusted, the adjustment condition that the display element 60 is lighted up by the output of the window detector 59 is destroyed, thus resulting in a problem in that the timer circuit 24 should be adjusted again.

The above description implies that it is impossible to independently and freely adjust the timer circuit by means of the horizontal synchronizing phase adjusting device 16, the sub-carrier phase adjusting device 35 and the hue adjusting device 44, thus causing a complicated TBC adjustment operation.

Figure 4A:
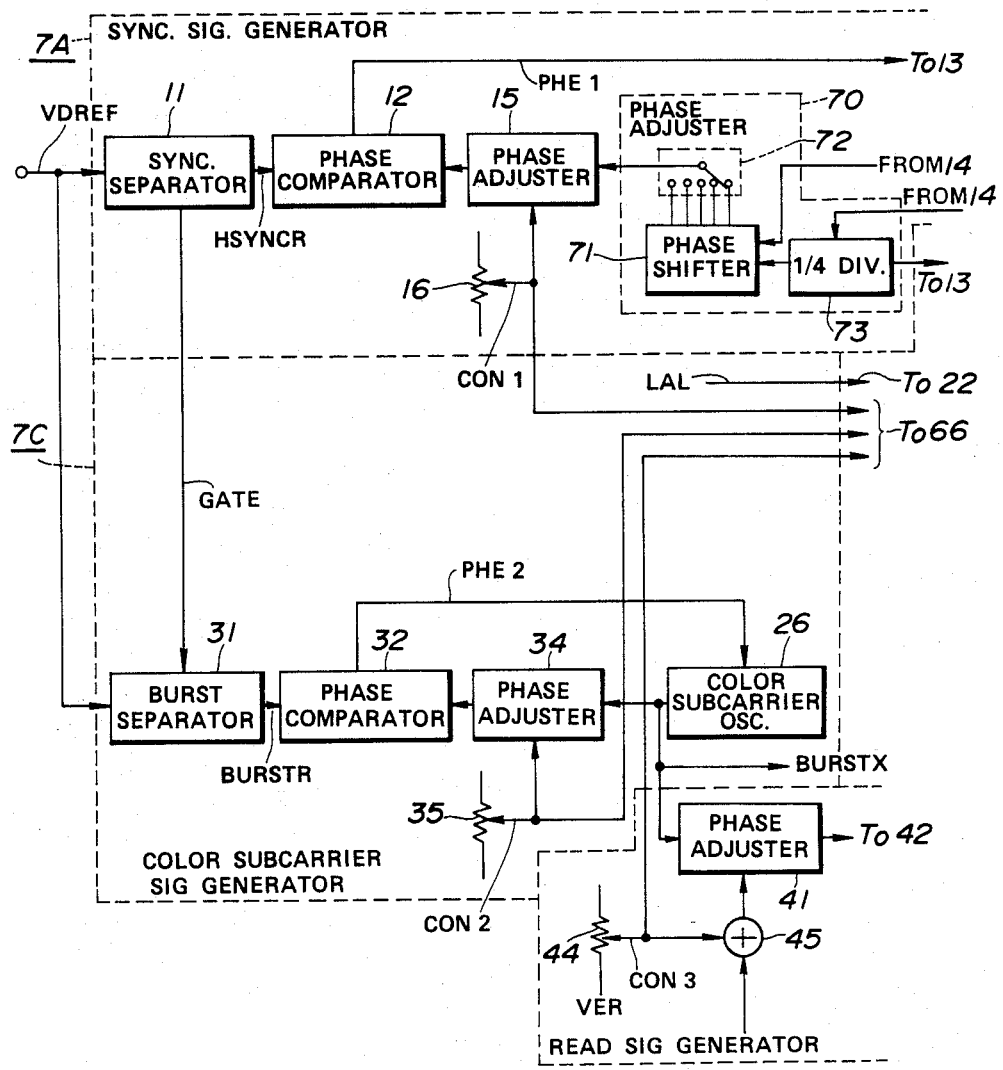
FIGS. 4A-4B is a schematic block diagram of a read clock generator including the first embodiment of the read start pulse generator according to the present invention.
Figure 4B:
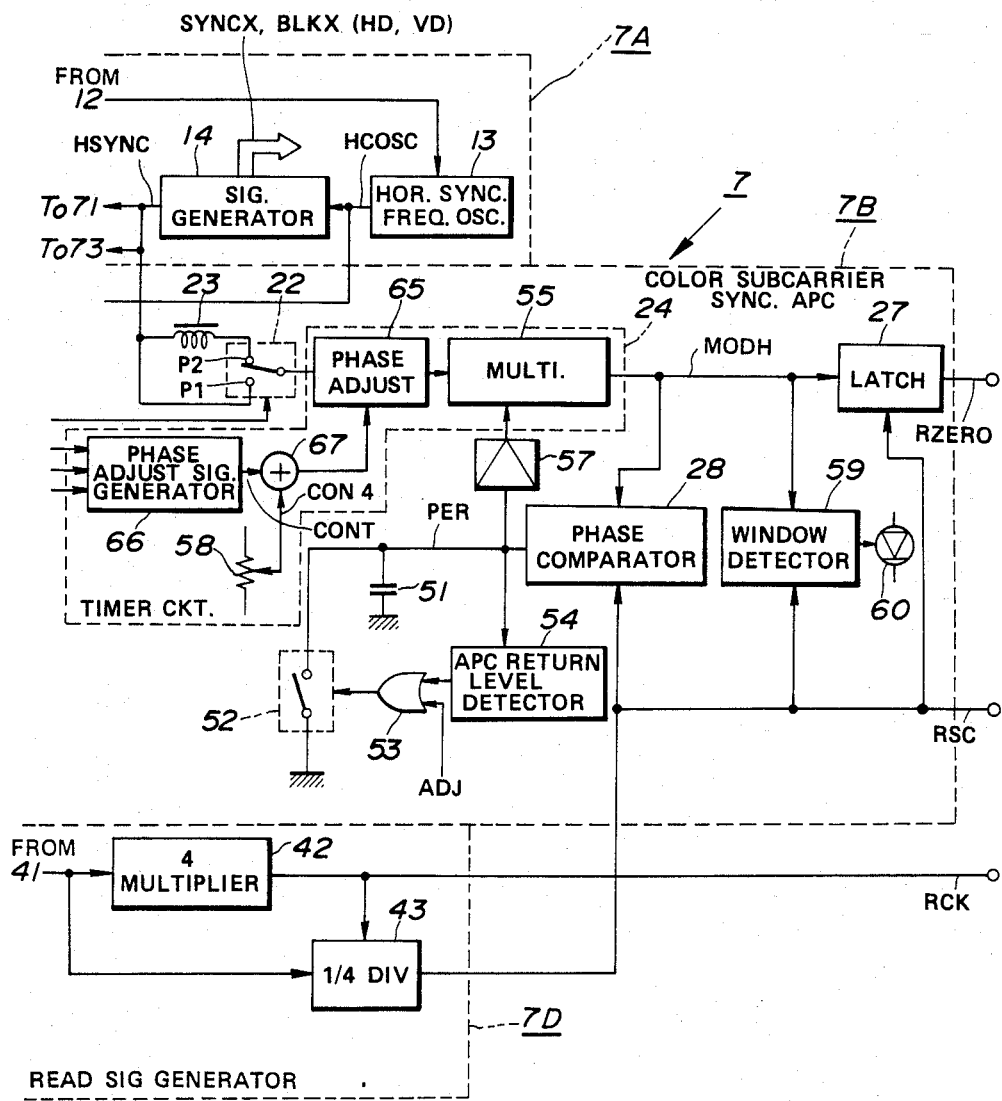

In view of the above description, reference is now made to a first embodiment of the read start pulse generator included in the read clock generator according to the present invention, with reference to FIG. 4. As shown by attaching the same reference numerals to the sections corresponding to FIG. 2, the configuration of the timer circuit 24 of the APC 7B for the color subcarrier synchronization is different from that shown in FIG. 2. That is to say, in the read clock generator shown in FIG. 4, the output of a switch circuit 22 is supplied to a mono-multivibrator 55 through a phase adjuster 65 made up of phase shifters, and outputs of a horizontal synchronizing color subcarrier phase adjusting device 58 and a phase adjust signal generator 66 are supplied through an adder 67 to this phase adjuster 65 as a phase adjust signal.

Here, to this phase adjust signal generator 66, an adjust signal CON1 obtained by the horizontal synchronizing phase adjusting device 16 of a synchronizing signal generator 7A, an adjust signal CON2 obtained by a subcarrier phase adjusting device 35 of a color subcarrier signal generator 7C, and an adjust signal CON3 obtained by a hue adjusting device 44 of the read signal generator 7D are supplied. Further, a phase control signal CONT is supplied to the phase adjuster 65 via an adder 67 in such a way as to have a value which prevents the signal supplied to a phase comparator 28 of the APC 7B for color subcarrier synchronization as a comparison input from being changed in phase when each adjusting device 16, 35 and 44 is operated for adjustment.

In the case of this embodiment, in addition to the above configuration, a phase adjuster 70 is disposed between a signal generator 14 and a phase adjuster 15 of the synchronizing signal generator 7A. This phase adjuster 70 is composed of a phase shifter 71 for adjusting the phase time step by time step (i.e. 280 ns) of one period of the burst signal, a switching circuit 72 for manually switching the output taps, and a divider 73 for ¼ dividing the output of the horizontal synchronizing frequency oscillator 13 and for outputting a clock signal CK to the phase shifter 71, and the output obtained at the output terminal of the switching circuit 72 is supplied to the phase adjuster 15.

This phase adjuster 70 functions as an adjusting element for adjusting the phase difference between the horizontal synchronizing signal HSYNC and the reference horizontal synchronizing signal HSYNCR in cooperation with a horizontal synchronizing phase adjusting device 16. When a phase shift value of one (i.e. 280 ns) or more period of the burst signal is required, a coarse phase adjustment can be made for each 280 ns by switching the output taps of the switching circuit 72 and further a fine adjustment of 280 ns or less can be made by the horizontal synchronizing signal adjusting device 16.

Figure 5:
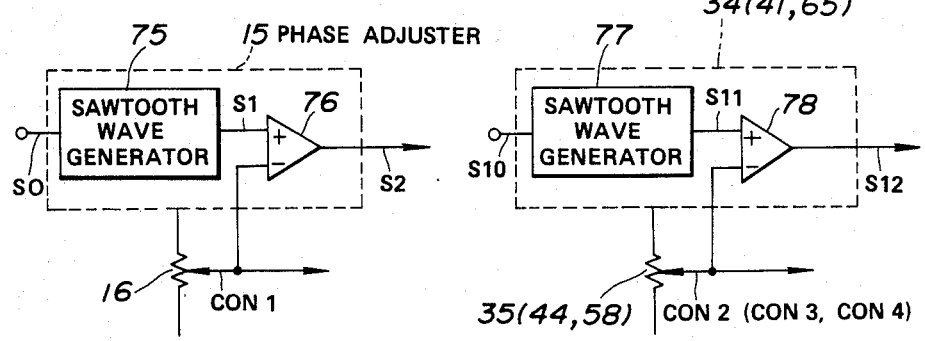
FIG. 5 is a detailed schematic diagram of a phase adjuster included in the synchronizing signal generator of the read clock generator shown in FIG. 4.
Figure 7:
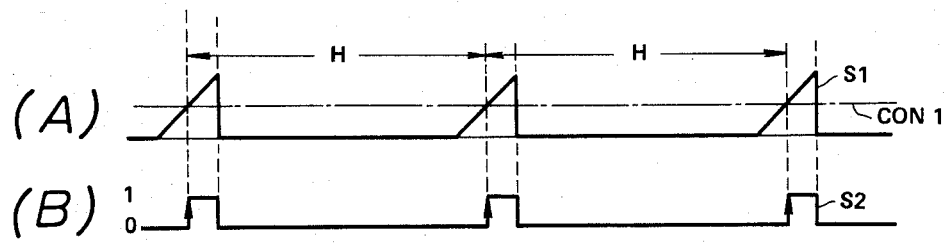
FIG. 7 is a timing chart showing the waveforms of the phase adjuster shown in FIG. 5.

The circuit configuration as shown in FIG. 5 is applicable to the phase adjuster 15. That is to say, a frequency input signal SO supplied from the phase adjuster 70 is received by a saw-tooth wave generator 75 for outputting a saw-tooth wave output $S_1$ (FIG. 7(A)) having a period H of the horizontal synchronizing signal. The saw-tooth wave output $S_1$ rises along a predetermined slope roughly during one period of the color subcarrier frequency so as to intermittently generate a triangular portion during a period H.

This saw-tooth wave output $S_1$ is compared with the adjust signal CON1 supplied from the horizontal synchronizing phase adjusting device 16 by the comparator 76. During the time interval while the saw-tooth wave output $S_1$ is higher than the adjust signal CON1 in signal level, an output signal $S_2$ (FIG. 7(B)) rising logically to "1" is outputted from the output terminal of the comparator 76.

Therefore, when the signal level of the adjust signal CON1 is changed by operating and adjusting the phase adjusting device 16, it is possible to controllably change the timing at which the output signal $S_2$ rises logically from "0" to "1" in level (that is, the phase during the timer interval of the period H).

Figure 6:
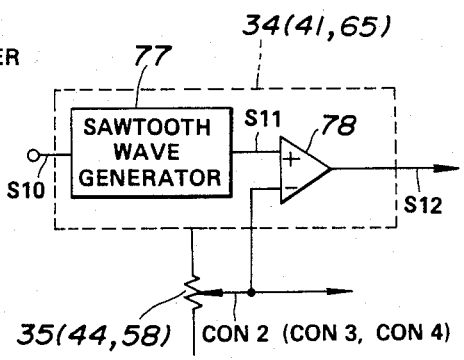
FIG. 6 is a detailed schematic diagram of a phase adjuster included in the color subcarrier signal generator of the read clock generator shown in FIG. 4.
Figure 8:
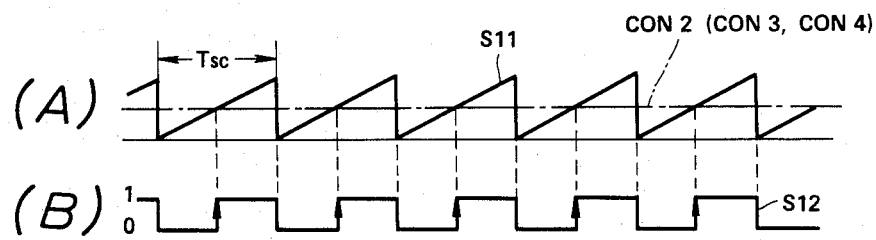
FIG. 8 is a timing chart showing the waveforms of the phase adjuster shown in FIG. 6.

The circuit configuration as shown in FIG. 6 is applicable to the phase adjusters 34, 41, and 65. In the same way as in the phase adjuster 15 (FIG. 5), the phase adjusters 34, 41 and 65 receive a frequency input signal $S_{10}$ through a saw-tooth wave generator 77. The sawtooth wave output $S_{11}$ (FIG. 8(A)) is compared by a comparator 78 with adjust signals CON2, CON3 and CON4 supplied from the subcarrier phase adjusting device 35, the hue adjusting device 44 and the horizontal synchronizing color subcarrier phase adjusting device 58 in order to output a comparison output $S_{12}$ (FIG. 8(B)). In this case, since the frequency input signal $S_{10}$ has a signal waveform in which triangular waves are continuously repeated with a period $T_{sc}$ of the color subcarrier frequency $f_{sc}$, the comparison output $S_{12}$ can be changed by controlling the phase of leading edge from logical "0" to logical "1" during the period $T_{sc}$ according to the signal levels of the adjust signals CON2, CON3 and CON4.

In the system configuration as described above, the read clock generator 7 can be adjusted in the same way as described with reference to FIG. 2. That is, first the phase difference between the reference horizontal synchronizing signal HSYNCR included in the reference pulse signal VDREF and the horizontal synchronizing signal HSYNC is adjusted by the use of the phase adjuster 70 and the phase adjusting device 16 both included in the synchronizing signal generator 7A. At this moment, the coarse adjustment can be made for each period (i.e. 280 ns) of the burst signal by switching the coarse phase difference on the basis of the switching operation of the switching circuit 72 of the phase adjuster 70. In addition, the fine adjustment less than one period can be made by adjusting the phase adjusting device 16 of the phase adjuster 15.

Further, by adjusting the phase adjusting device 35 of the color subcarrier signal generator 7C, the phase difference between the burst signal included in the reference pulse signal VDREF and the burst signal of the TBC output is adjusted as occasion demands. The adjustable range of one period of the burst signal, that is, within ±140 ns is sufficient for this phase adjusting device 35.

Further, by adjusting the phase adjusting device 44 of the read signal generator 7D, the phase difference between the burst signal included in the reference pulse signal VDREF and the chrominance signal of the TBC output is adjusted. In this case, the adjustable range of one period of the chrominance signal, that is, within ±140 ns is sufficient for the phase adjusting device 44.

After these adjustments, the switching circuit 52 of the color subcarrier synchronizing APC 7B is turned on in response to of the adjustment mode signal ADJ, and the phase difference is set by adjusting the phase adjusting device 58 between the horizontal synchronizing signal and the color subcarrier when the phase error output PER of the phase comparator 28 is zero. The above setting is kept until the display element 60 is lighted up. Thereafter, when the switching circuit 52 is turned off by switching the adjustment mode signal ADJ to the normal mode, it is possible to realize the state where the timer output MODH of the timer circuit 24 follows the phase of the read subcarrier signal RSC, thus it being possible to send out the read start pulse signal RZERO of good reproducibility from the latch circuit 27 of the color subcarrier synchronizing APC 7B.

In the state where the system is pulled into this APC operation, if phase difference between the horizontal synchronizing signal HSYNCR of the reference pulse signal VDREF and the horizontal synchronizing signal HSYNC is required to adjust, the coarse adjustment is first made by switching the switching circuit 72 of the phase adjuster 70 in the synchronizing signal generator 7A, and then the fine adjustment is made by the use of the phase adjusting device 16. In this state, the oscillation frequency of the horizontal synchronizing frequency oscillator 13 can be controlled on the basis of the phase error output PHE1 of the phase comparator 12 in the synchronizing signal generator 7A in accordance with the above adjustment operation, so that the phase of the horizontal syuchronizing signal SYNCX can be changed or controlled relative to the phase adjuster 9 (FIG. 1) of the time base corrector.

In this case, however since the adjust signal CON1 supplied from the phase adjusting device 16 to the phase adjuster 15 is also given to the phase adjust signal generator 66 so that the phase shift value of the phase adjuster 65 is changed or controlled, the phase adjuster 65 operates so as to compensate for the value corresponding to the change in phase of the horizontal synchronizing signal HSYNC; as a result, the phase error output PER obtained at the output terminal of the phase comparator 28 is kept unchanged.

In this connection, since the adjustment in the phase adjuster 70 is made in the unit of burst signal period, only the adjustment value (i.e. within the phase difference of ±140 ns) on the basis of the adjustment signal CON1 supplied from the phase adjusting device 16 is generated by the phase comparator 28 as an effective value.

Further, when the phase difference is required to change between the burst signal BURST included in the reference pulse signal VDREF and the burst signal BURSTX of the output video signal VDOUT, it is sufficient to change the phase shift value of the phase adjuster 34 by operating the adjusting device 35. In this state, since the oscillation frequency of the color subcarrier frequency oscillator 26 is changed by a value corresponding to the adjust signal CON2, it is possible to adjust the phase of the burst signal BURSTX.

Further, since the change corresponding to that of the adjust signal CON2 is produced in the control output signal CONT of the phase adjust signal generator 66, the phase shift value of the phase adjuster 65 can be changed. As a result, although the phase of the timer output MODH supplied to the phase comparator 28 changes, the phase of the read subcarrier signal RSC supplied from the read signal generator 7D also changes according to the change of the burst signal BURSTX. Therefore, no change is produced at the phase error output PER of the phase comparator 28 due to the adjustment of the phase adjusting device 35, so that the APC 7B maintains the state where the phase is being locked. As described above, it is possible to adjust the phase of the color subcarrier without changing the timing of the read start pulse signal RZERO.

Further, when the hue of the chrominance signal included in the output video signal VDOUT is required to change, it is sufficient to adjust the hue adjusting device 44 of the read signal generator 7D. In this case, the change produced in the adjust signal CON3 of the phase adjusting device 44 changes the phase shift value of the phase adjuster 41 through the adder 45, so that the phases of the read subcarrier signal RSC and the read clock signal RCK can be changed for control.

Further, in this case, since the adjust signal CON3 of the phase adjusting device 44 changes or controls the phase shift value of the phase adjuster 65 through the phase adjust signal generator 66, it is possible to adjust the hue without producing a change in the phase error output PER of the phase comparator 28, so that the phase lock state can be maintained as it is in the color subcarrier synchronizing APC 7B.

Therefore, in the system configuration shown in FIG. 4, even if the horizontal synchronizing phase adjusting device 16, the subcarrier phase adjusting device 35 and the hue adjusting device 44 are adjusted independently, it is possible to maintain the phase lock state as it is in the color subcarrier synchronizing APC 7B. Therefore, it is unnecessary to readjust the horizontal synchronizing color subcarrier phase adjusting device 58 in the color subcarrier synchronizing APC 7B, as described in the prior-art read clock generator shown in FIG. 2, after the adjusting devices 16, 35, 44 have been operated.

The operation of the read clock generator shown in FIG. 4 will be described hereinbelow:

(1) The horizontal synchronizing signal HSYNC is adjusted relative to the reference horizontal synchronizing signal HSYNCR by the use of the coarse phase adjuster 72 and the fine phase adjusting device 16.

(2) The burst signal BURSTX is adjusted relative to the reference burst signal BURSTR by the use of the phase adjusting device 35.

(3) The read clock signal RCK and the read subcarrier signal RSC (chrominance) are adjusted relative to the reference burst signal BURSTX by the use of the phase adjusting device 44 and the velocity error signal VER.

(4) The switch circuit 52 is turned on to set a phase difference between the horizontal synchronizing signal (timer output MODH) and the subcarrier signal (burst BURST), when the phase error output PER is zero, by the use of the phase adjusting device 58.

(5) Thereafter, the switch circuit 52 is turned off to pull-in the timer output MODH in the read subcarrier signal RSC, so that a stable read start pulse RZERO is generated.

(6) Under this APC operation, the horizontal synchronizing signal HSYNCR can be adjusted again by the use of only the phase adjusting device 16. The adjust signal CON 1 is supplied to the phase adjust signal generator 66 for controlling the phase shift value in the phase adjuster 65 so as to compensate the adjuster 65 for the change in phase of the signal HSYNCR without changing of the phase error signal PER.

(7) The burst signal BURSTX can be adjusted by the use of the adjusting device 35. The adjust signal CON 2. Therefore, although the timer output MODH changes in phase, since the read subcarrier signal RSC also changes in phase according to the burst signal BURSTX, the phase error output PER is kept unchanged; that is, the color subcarrier phase can be adjusted without changing the timing of the read start pulse signal RZERO.

(8) The hue of the chrominance signal can be adjusted by the use of the hue adjusting device 44. The adjust signal CON 3 is supplied to the phase adjust signal generator 66 for controlling the phase shift value in the phase adjuster 65 so as to compensate the adjuster 65 for the change in phase of the chrominance signal without changing of the phase error signal PER.

Second Embodiment

Figure 9A:
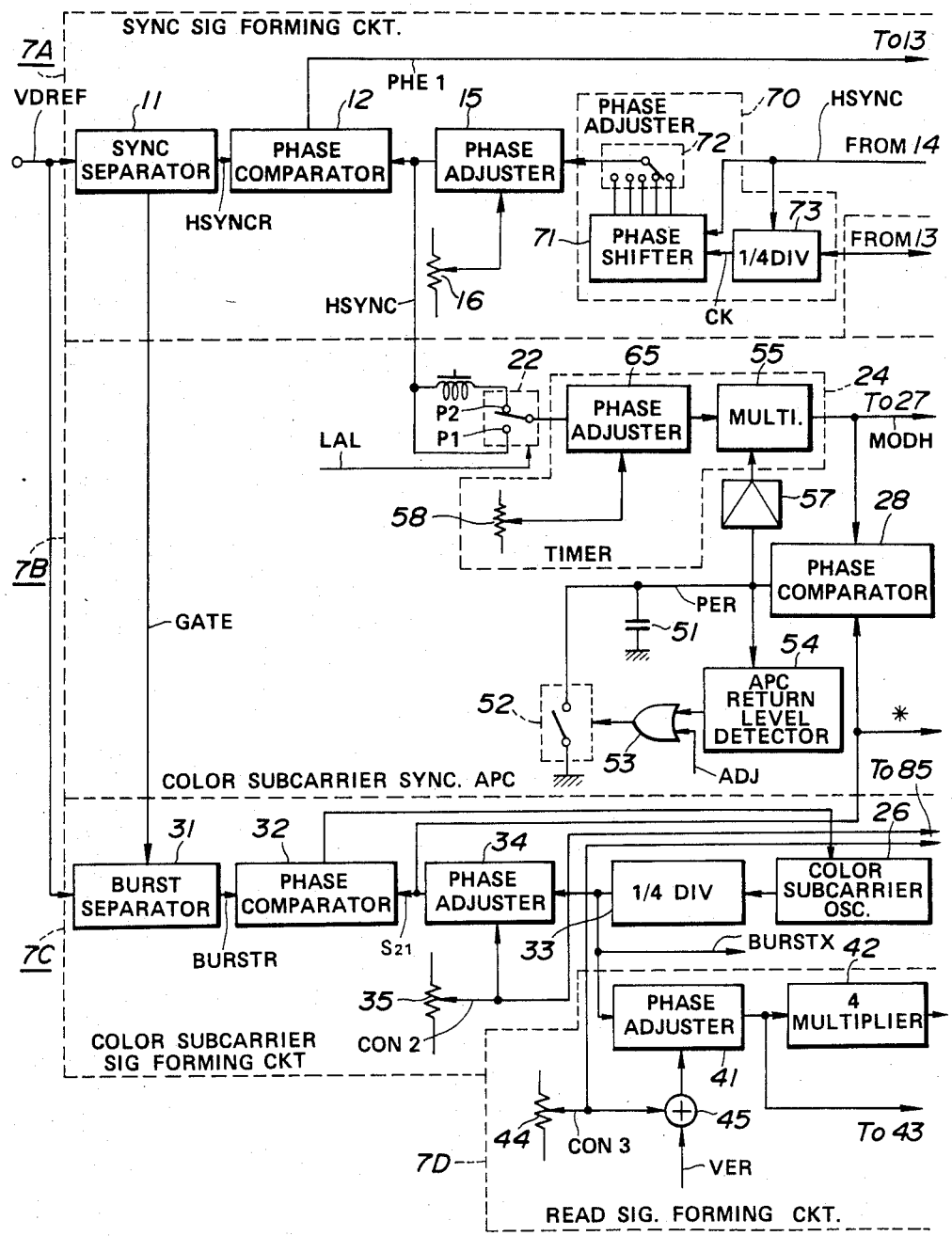
FIGS. 9A-9B is a schematic block diagram of a read clock generator including the second embodiment of the read start pulse generator according to the present invention.
Figure 9B:
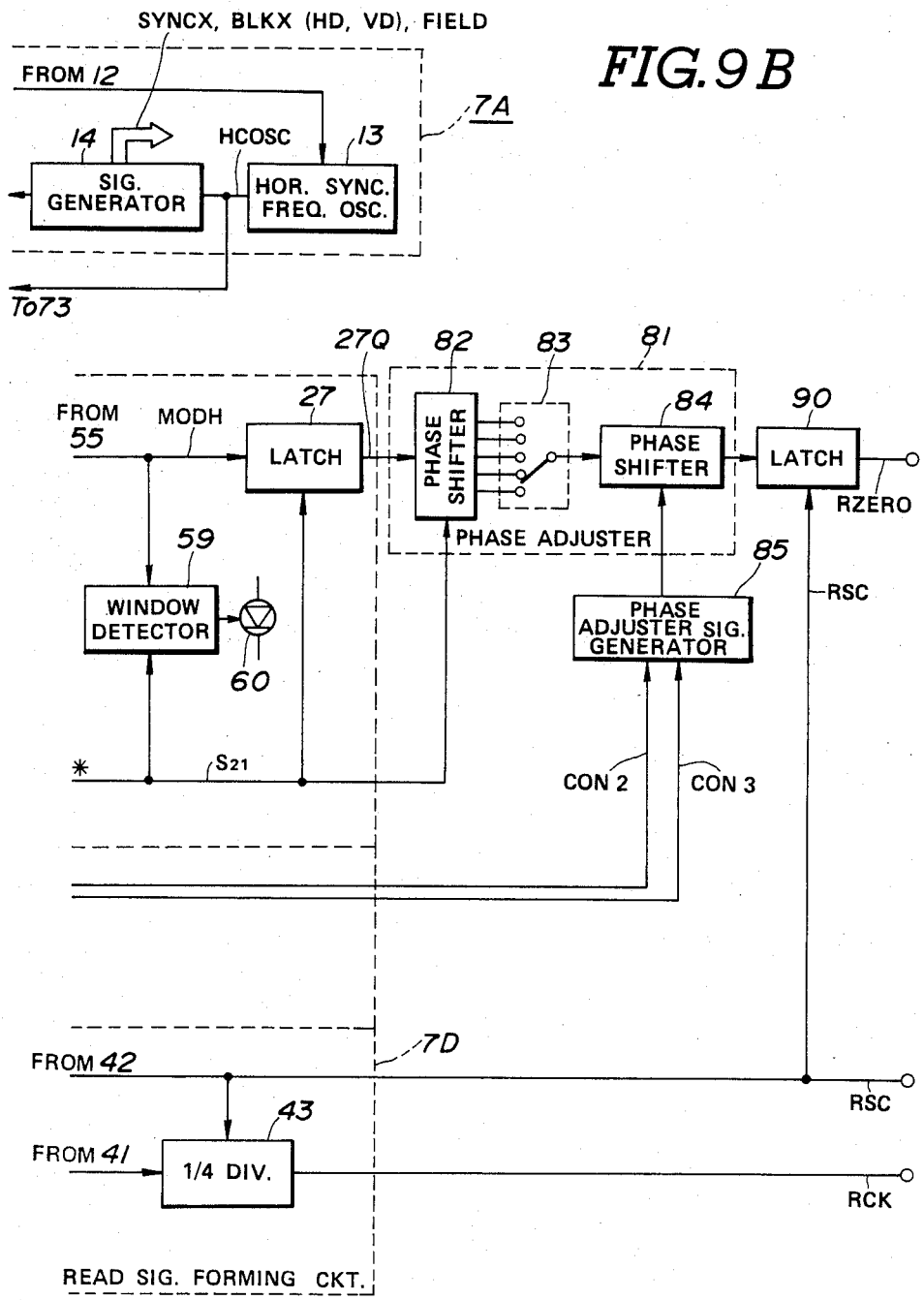

FIG. 9 shows a second embodiment of the present invention. As shown by designating the sections corresponding to those shown in FIG. 4 by the same reference numerals, the adjust signals CON1, CON2, and CON3 are not supplied to the phase adjuster 65 of the timer circuit 24, but instead the system configuration is such that the phase adjustment is made at the rear stage of the APC loop.

That is to say, in the color subcarrier synchronizing APC 7B of this embodiment, the frequency output S21 supplied from the phase adjuster to the phase comparator 32 of the color subcarrier signal generator 7C is also supplied to the phase comparator 28, the window detector 59 and the latch circuit 27, to all of which the timer output MODH is supplied. This frequency output S21 is in synchronization with the burst signal BURSTR separated from the reference pulse signal VDREF on the basis of the phase pull-in operation due to the phase comparator 32. Therefore, the color subcarrier synchronizing APC 7B operates so as to synchronize the horizontal synchronizing signal HSYNC obtained by the synchronizing signal generator 7A with the burst signal of the reference pulse signal VDREF.

On the other hand, in the same way as in FIG. 4, the system configuration is such that the phase adjuster 70 including the phase shifter 71, the switching circuit 72 and the divider 73 is disposed between the signal generator 14 and the phase adjuster 15. Therefore, when the switching circuit 72 is switched, it is possible to coarsely adjust the phases of the horizontal synchronizing signal SYNCX, the blank signal BLKX (HD and VD signals) and the field signal FIELD all obtained from the signal generator 14 by switching the switching circuit 72. Additionally, the fine phase adjustment within one period of the burst signal (within ±140 ns) can be made by the horizontal synchronizing phase adjusting device 16.

However, being different from the embodiment shown in FIG. 4, in this embodiment the horizontal synchronizing signal HSYNC sent to the color subcarrier synchronizing APC 7B can be taken from the input terminal of the phase comparator 12 on the oscillation frequency signal side. Therefore, if the adjusting device 16 is adjusted, the phase of the horizontal synchronizing signal HSYNC does not change. Therefore, the point that the phase of the horizontal synchronizing signal HSYNC is synchronized with the reference horizontal synchronizing signal HSYNCR is different from that shown in FIG. 4.

Further, the output 27Q of the latch circuit 27 of the color subcarrier synchronizing APC 7B is not directly used as the read start pulse signal RZERO, but supplied to the phase shifter 82 provided in the phase adjuster 81 and driven by the frequency output S21. In the same way as in the phase shifter 71 of the phase adjuster 70, the phase shifter 82 has a plurality of phase outputs having different phase shift values within one period of the burst signal. These phase outputs are selected by the switching circuit 83, the operation of which is linked with that of the switching circuit 72, and then supplied to the phase shifter 84.

In the phase shifter 84, the phase shift value (within ±140 ns) within one period of the burst signal is controlled by a control signal supplied from the phase adjust signal generator 85. To the phase adjust signal generator 85, the adjust signal CON2 of the subcarrier phase adjusting device 35 and the adjust signal CON3 of the hue adjusting device 44 are supplied. When a predetermined phase difference is produced relative to the phase of the burst signal BURSTR obtained from the reference pulse signal VDREF by the adjust signals CON2 and CON3, a control signal corresponding to this phase shift value is supplied to the phase shifter 84 in order to shift the phase of the output 27Q of the latch circuit 27.

The output 27Q the phase of which is thus adjusted by the phase adjuster 81 is supplied to the output latch circuit 90. To this output latch circuit 90, the read subcarrier signal RSC is supplied as a drive signal. By this, the read start pulse signal RZERO synchronized with the read subcarrier signal RSC is outputted from the output latch circuit 90.

In the embodiment shown in FIG. 9, the color subcarrier synchronizing APC 7B synchronizes the horizontal synchronizing signal HSYNC, the frequency signal of which is in synchronization with the horizontal synchronizing signal HSYNCR separated from the reference pulse signal VDREF, with the frequency output S21 synchronized with the burst signal BURSTR separated from the reference pulse signal VDREF on the basis of the APC loop in the comparator 28. Further, the APC 7B latches the phase which is the reference of the read start pulse by the latch circuit 27.

When the phase of the color burst is adjusted by the use of the phase adjusting device 35 or the phase of the hue is adjusted by the use of the phase adjusting device 44, the latch output 27Q is shifted by the phase adjuster 81 by the phase shift value corresponding to the above. Therefore, the phase in the latch output 27Q is adjusted by the value corresponding to the phase differences produced in the read subcarrier signal RSC and the read clock signal RCK due to the phase adjusting devices 35 and 44, and is latched by the latch circuit 90 in synchronization with the read subcarrier signal RSC.

Here, the phase of the read start pulse signal RZERO is kept while maintaining the phase pull-in status obtained in the color subcarrier synchronizing APC 7B. As a result, it is unnecessary to readjust the color subcarrier synchronizing APC after the phase adjusting devices 35, 44 have been adjusted, being different from the system configuration as shown in FIG. 2.

In the case of the embodiment shown in FIG. 9, when the phase of the horizontal synchronizing signal is adjusted in the synchronizing signal generator 7A, since there are provided the phase shifter 71 and the switching circuit 72 for adjuting the phase of the color burst signal in the unit of period and there are the phase shifter 82 and the switching circuit 83 on the output side of the APC 7B so as to be linked with the above 71 and 72, even if the phase of the horizontal synchronizing signal is adjusted by the phase shift value several times greater than the period of the color subcarrier, it is possible to securely adjust the phase of the read start pulse signal RZERO.

Operation

In the state where the automatic phase controller 7B for color subcarrier synchronization locks the phase between the read horizontal synchronizing signal HSYNC and the read subcarrier signal RSC in an optimum phase relationship, when the phase relationship between the read horizontal synchronizing signal HSYNC and the read subcarrier signal RSC is offset deviating from the optimum phase relationship because the phase adjusting devices 16, 35, and 44 are operated, since the offset can be cancelled out by the phase adjusting means 24 and 81, it is possible to securely maintain the optimum phase relationship locked by the automatic phase controller 7B for color subcarrier synchronization without destruction.

Therefore, when the phases of the read horizontal synchronizing signal HSYNC and the read subcarrier signal RSC are adjusted by the phase adjusting devices, it is possible to obtain a predetermined phase with sufficient reproduction, thus it being possible to obtain an good reproducible output image signal VD out of the memory.

Effect of the Invention

As described above, according to the present invention, after the phases of the horizontal synchronizing signal and the burst signal have been adjusted to the optimum phase in the color subcarrier synchronizing APC 7B, even if the phase of the horizontal synchronizing signal, the burst signal or the chrominance signal of the output video signal is adjusted by any given phase shift value relative to the phase of the horizontal synchronizing signal, the burst signal or the chrominance signal of the reference pulse signal VDREF, it is possible to obtain a read start pulse generator by which it is possible to securely maintain the optimum phase synchronization relationships between the horizontal synchronizing signal and the burst signal without need of any other complicated operations.

What is claimed is:

1. A read clock generator of an automatic color subcarrier synchronizing phase controller type; comprising
means for generating a read horizontal synchronizing signal and a read subcarrier signal both adjustably phase-shifted by predetermined values from a reference horizontal synchronizing signal and a reference burst signal both separated from a reference pulse signal;
a timer producing a timer output;
means for making a phase comparison between said timer output and the read subcarrier signal after a predetermined timer time has elapsed from the read horizontal synchronizing signal;
means for latching the timer time by the read subcarrier signal while controlling the timer time so that a phase error signal between the timer output and the read subcarrier signal becomes zero in order to generate a read start pulse in synchronization with the read subcarrier signal; and means for adjusting the phase of the timer output by cancelling phase offsets caused by the phase-shifted read horizontal synchronizing signal and the phase-shifted read subcarrier signal.

2. A read clock generator of an automatic color subcarrier synchronizing phase controller type; comprising means for generating a reference horizontal synchronizing signal and a reference burst signal both separated from a reference pulse signal;

means for making a phase comparison between a timer output and the reference burst signal after a predetermined timer time has elapsed from the reference horizontal synchronizing signal;

means for latching the timer time in response to the burst signal while controlling the timer time so that a phase error signal between the timer output and the reference burst signal becomes zero in order to generate a latch output; and means for adjusting the phase of the latch output by cancelling phase offsets caused by the phase-adjusted burst signal and a hue adjust signal before generating a read start pulse signal by latching the latch output in response to a phase-adjusted read subcarrier signal.

3. In a read clock generator for a time base corrector having:

a synchronizing signal generator including a horizontal synchronizing phase adjusting device, responsive to a reference pulse signal including a reference synchronizing signal, for generating a read synchronizing signal adjustable in phase relative to the reference synchronizing signal, a color subcarrier signal generator including a subcarrier phase adjusting device, responsive to the reference pulse signal including a reference burst signal, for generating a burst signal adjustable in phase relative to the reference burst signal, and a read signal generator including a hue adjusting device, responsive to the adjusted burst signal, for generating a read subcarrier signal and a read clock signal both adjustable in phase relative to and synchronized with the adjusted burst signal;

a read start pulse generator of color subcarrier synchronizing phase controller type, which comprises:

a switching circuit responsive to the adjusted synchronizing signal for outputting a trigger signal, the phase of the trigger signal being delayed a half period of the subcarrier signal for each horizontal scanning line;

a timer circuit including a horizontal synchronization color subcarrier phase adjusting device, responsive to the trigger signal, for outputting an adjustable timer output, the timer time thereof being approximate to a timing at which a read start pulse signal is generated;

a latch circuit responsive to the timer output for latching a logical level of the timer output at a timing at which the adjusted burst signal is zero in voltage level and for generating the start pulse signal in synchronization with the read subcarrier signal;

a phase comparator for making a phase comparison between the timer output and the read subcarrier signal and outputting a phase error signal between the two to said timer circuit to control the timer time so that the phase error signal becomes zero; and means for automatically adjusting the phase of the timer output by cancelling a phase offset between the read synchronizing signal and the read subcarrier signal due to the adjusted read synchronizing signal and the adjusted read subcarrier signal;

whereby once the timer circuit is adjusted, it is unnecessary to readjust the adjusted timer time even after the horizontal synchronization phase adjusting device, the subcarrier phase adjusting device, and the hue adjusting device have been adjusted.

4. Apparatus as set forth in claim 3, wherein said means for automatically adjusting the phase of the timer output comprises:

a phase adjust signal generator connected to the horizontal synchronization phase adjusting device, the subcarrier phase adjusting device and the hue adjusting device for generating a phase control signal corresponding to each phase change caused by these adjusting devices; and a first phase adjuster connected between the switching circuit and the timer circuit for compensating for a phase difference between the horizontal synchronizing signal and the timer output in response to the phase control signal outputted from said phase adjust signal generator.

5. Apparatus as set forth in claim 4, which further comprises a second phase adjuster incorporated in said synchronizing signal generator for roughly adjusting a phase difference between the reference horizontal synchronizing signal and the horizontal synchronizing signal beyond one period of the burst signal, the horizontal synchronizing signal adjusting device being used as a fine adjusting device.

6. In a read clock generator for a time base corrector having:

a synchronizing signal generator including a horizontal synchronization phase adjusting device, responsive to a reference pulse signal including a reference synchronizing signal, for generating a read synchronizing signal synchronized with the reference synchronizing signal, a color subcarrier signal generator including a subcarrier phase adjusting device, responsive to the reference pulse signal including a reference burst signal, for generating a burst signal adjustable in phase relative to the reference burst signal and a burst signal synchronized with the reference burst signal, and a read signal generator including a hue adjusting device, responsive to the adjusted burst signal, for generating a read subcarrier signal and a read clock signal both adjustable in phase relative to and synchronized with the adjusted burst signal;

a read start pulse generator of color subcarrier synchronizing phase controller type, which comprises:

a switching circuit responsive to the read synchronizing signal for outputting a trigger signal, the phase of the trigger signal being delayed a half period of the subcarrier signal;

a timer circuit including a horizontal synchronization color subcarrier phase adjusting device, responsive to the trigger signal, for outputting an adjustable timer output, the timer time thereof being approximate to a timing at which a read start pulse signal is generated;

a first latch circuit responsive to the timer output for latching a logical level of the timer output at a timing at which the burst signal is zero in voltage level and for generating a latch output;

a phase comparator for making a phase comparison between the timer output and the burst signal and outputting a phase error signal beween the two to said timer circuit to control the timer so that the phase error signal becomes zero; and means for automatically adjusting the phase of the latch output by a phase-shift value caused by the subcarrier phase adjusting device and the hue adjusting device or corresponding to phase shift in the read subcarrier signal and the read clock signal, whereby once the timer circuit is adjusted, it is unnecessary to readjust the adjusted timer time even after the horizontal synchronization phase adjusting device, the subcarrier phase adjusting device and the hue adjusting device have been adjusted.

7. Apparatus as set forth in claim 6, wherein said means for automatically adjusting the phase of the latch output comprises:

a phase adjust signal generator connected to the subcarrier phase adjusting device and the hue adjusting device for generating a phase control signal corresponding to each change caused by the adjusting devices;

a first phase adjuster connected to said latch circuit for compensating for phase shift of the latch output; and a second latch circuit connected to said phase adjuster for latching the compensated latch output in response to the read subcarrier signal to generate the read start pulse signal.

8. Apparatus as set forth in claim 7, which further comprises: a second phase adjuster incorporated in said synchronizing signal generator for roughly adjusting a phase difference between the reference synchronizing signal and a horizontal synchronizing signal beyond one period of the burst signal, the horizontal synchronizing signal adjusting device being used as a fine adjusting device, said second phase adjuster being linked for switching operation with said first phase adjuster.

* * * * *